United States Patent [19]

Fukushima et al.

[11] Patent Number: 5,016,124

[45] Date of Patent: May 14, 1991

[54] RECORDING APPARATUS WITH CONTROL OF ENERGY TO THE DRIVE AT START UP

[75] Inventors: Nobuo Fukushima; Shinji Sakai; Osamu Takeda; Yasutomo Suzuki; Masahiro Takei, all of Kanagawa, Japan

[73] Assignee: Canon Kabushiki Kaisha, Tokyo, Japan

[21] Appl. No.: 2,175

[22] Filed: Jan. 12, 1987

[30] Foreign Application Priority Data

| Jan. 14, 1986 | [JP] | Japan | 61-005977 |
| Jan. 31, 1986 | [JP] | Japan | 61-020503 |
| Jan. 31, 1986 | [JP] | Japan | 61-020504 |
| Jan. 31, 1986 | [JP] | Japan | 61-020505 |
| Jan. 31, 1986 | [JP] | Japan | 61-020506 |

[51] Int. Cl.$^5$ .................................. G11B 19/20
[52] U.S. Cl. ........................ 360/69; 360/71; 360/73.03; 369/243; 369/266; 318/139; 358/906
[58] Field of Search ............ 360/69, 71, 73, 137, 360/75, 78, 70, 73.01–73.14, 78.01, 78.06, 78.07, 78.02, 78.04; 369/189, 190, 239, 243, 266, 267, 32, 33, 41, 19, 50, 53; 318/139, 278, 453, 778; 358/906, 909

[56] References Cited

U.S. PATENT DOCUMENTS

| 4,393,420 | 7/1983 | Tomizawa | 360/73 |
| 4,480,278 | 10/1984 | Maeda | 360/73 |
| 4,636,905 | 1/1987 | Morimoto et al. | 360/137 |
| 4,675,855 | 6/1987 | Iso et al. | 369/32 |
| 4,727,443 | 2/1988 | Miyake et al. | 360/75 |

FOREIGN PATENT DOCUMENTS

| 60-143473 | 7/1985 | Japan | 369/233 |
| 60-147979 | 8/1985 | Japan | 360/71 |
| 60-176495 | 9/1985 | Japan | 318/139 |

OTHER PUBLICATIONS

Bell System Technical Journal, vol. 62, No 1, Hagland et al., 1/83, pp. 235–254.

Primary Examiner—Aristotelis M. Psitos
Assistant Examiner—Steven R. Garland
Attorney, Agent, or Firm—Robin, Blecker, Daley & Driscoll

[57] ABSTRACT

A recording apparatus comprises a recording head arranged to record signals on a recording medium; a motor for shifting a relative position between the recording medium and the recording head; and a control circuit arranged to apply electric energy to the motor in starting the motor either in a first mode in which the electric energy is limited to a first value or in a second mode in which the electric energy is limited to a second value which is lower than the first value. Also disclosed is a motor control circuit which is highly suited to the recording apparatus. Detecting apparatus is also included to detect whether the power source is an A.C. adapter or a battery.

29 Claims, 9 Drawing Sheets

FIG. 10

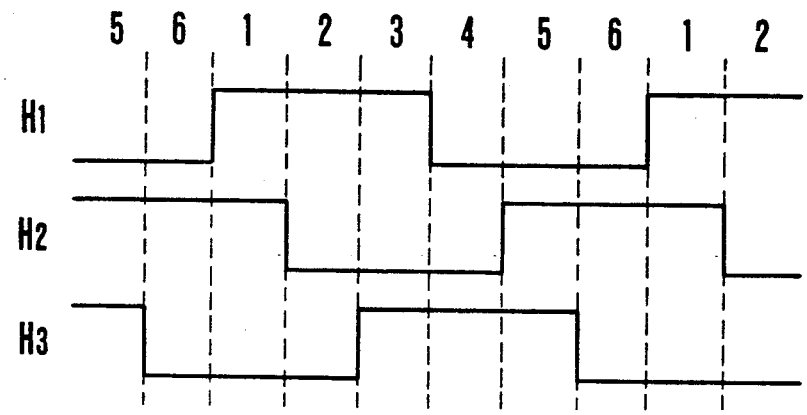

FIG. 11

| OUTPUT | LOGICAL EXPRESSION | | | | DC MOTOR |
|---|---|---|---|---|---|
| | THREE-PHASE MOTOR | | | | |
| nVH | $\bar{S}$ | | H2 | $\overline{H3}$ | $\bar{S}$ |
| nUH | $\bar{S}$ | H1 | $\overline{H2}$ | | |
| nWH | $\bar{S}$ | $\overline{H1}$ | | H3 | |
| nWL | $\bar{S}$ | H1 | | $\overline{H3}$ | $\bar{S}$ |
| nUL | $\bar{S}$ | $\overline{H1}$ | H2 | | |
| nVL | $\bar{S}$ | | $\overline{H2}$ | H3 | |
| SUHWL | S | H1 | $\overline{H2}$ | $\overline{H3}$ | |
| SUHVL | S | H1 | $\overline{H2}$ | H3 | |
| SWHVL | S | $\overline{H1}$ | $\overline{H2}$ | H3 | |
| SVHUL | S | $\overline{H1}$ | H2 | H3 | |
| SWHUL | S | $\overline{H1}$ | H2 | $\overline{H3}$ | |
| SVHWL | S | H1 | H2 | $\overline{H3}$ | S |

RECORDING APPARATUS WITH CONTROL OF ENERGY TO THE DRIVE AT START UP

BACKGROUND OF THE INVENTION

1. This invention relates to a recording apparatus and a motor control device which is highly suited to the recording apparatus.

2. Description of the Relates Art

Known recording apparatuses for recording signals on a recording medium includes electronic still picture camera arranged to record a video signal, for example, on a disc-shaped magnetic sheet. In the electronic camera of this kind, concentric circular tracks are formed on the magnetic sheet or disc which is employed as a recording medium by recording signals with a recording head while shifting the position of the recording head relative to the magnetic sheet by allowing the latter to rotate at a high and constant speed. It is necessary for the apparatus of this kind to minimize a time lag after a shutter release button is pushed for a start of recording and before an actual start of recording. To meet this requirement, the build-up of rotation of the magnetic sheet must be quickened as much as possible. For that purpose, it is conceivable to apply a maximum amount of electric energy to magnetic sheet driving means at the building-up time of rotation of the magnetic sheet. The same concept applies not only to the electronic camera but also to any other recording apparatus that is required to have a minimal degree of time lag at the start thereof.

However, in the conventional recording apparatuses in general, the time lag minimization at the start of the above-stated driving means for shifting a relative position between the recording medium and the recording head is not always necessary. For example, in the case of the electronic still (picture) camera, the magnetic sheet is caused to begin to rotate for the purpose of detecting the presence or absence of any previous record in each of recording tracks on the magnetic sheet. Although it is preferable to have the above-stated time lag arranged to be short also in that instance, the necessity for a short time lag is not so strong as compared with the start of actual recording after the shutter release button is pushed. If, despite of such different occasions, the above-stated time lag minimizing starting operation is always indiscriminatingly performed, a waste of a limited battery capacity would result in an excessive drop of a power supply voltage causing a malfunction of some other related device.

This problem has existed not only with the electronic still picture camera but also with other recording apparatuses of the kind arranged to perform recording by changing the relative position between the recording medium and the recording head.

SUMMARY OF THE INVENTION

A first object of this invention is to solve the above-stated problem of the prior art.

A second object of this invention is to provide a recording apparatus which is capable of minimizing not only the above-stated time lag but also electric energy consumption and a motor control circuit which is highly suited, for example, to the recording apparatus.

Under this object, a recording and/or reproducing apparatus which is arranged as a preferred embodiment of this invention comprises: a recording/reproducing head for recording and reproducing signals on and from a recording medium; driving means for shifting the positions of the recording medium and the heads relative to each other; control means arranged to apply electric energy to the driving means in starting the driving means either in a first starting mode in which the electric energy applied to the driving means is limited to a first value or in a second starting mode in which the electric energy applied is limited to a second value which is lower than the first value; and change-over means for making selection between the first and second starting modes according to the operating state of the recording and/or reproducing apparatus.

It is another object of this invention to provide a motor control circuit which enables a motor to have a high build-up speed of its rotation when necessary and minimizes electric energy consumption when the high build-up speed is not necessary.

Under that object, a motor control circuit which is arranged according to this invention as a preferred embodiment thereof comprises a first circuit which is arranged to limit a motor driving current to a first value and a second circuit which is arranged to limit the motor driving current to a second value lower than the first value, the first and second circuits being arranged separately from each other.

It is a further object of this invention to provide a recording apparatus which is capable of always appositely controlling a motor in accordance with the supply capacity of the power source thereof and a motor control circuit which is highly suited to the recording apparatus.

Other objects and features of the invention will become apparent from the following detailed description of embodiments thereof taken in conjunction with the accompanying drawings.

BRIEF DESCRIPTION OF THE DRAWINGS

FIG. 2 is a flow chart showing a preparatory operation to be performed by a controller 91 for recording when a power supply switch 94 shown in FIG. 1A is turned on.

FIG. 10 is a time chart showing pulse signals H1, H2 and H3 which are supplied to a change-over circuit Lo included in FIG. 1.

FIG. 11 shows a logical expression of the operation of the change-over logic circuit Lo.

DETAILED DESCRIPTION OF THE PREFERRED EMBODIMENTS

Figure 1:
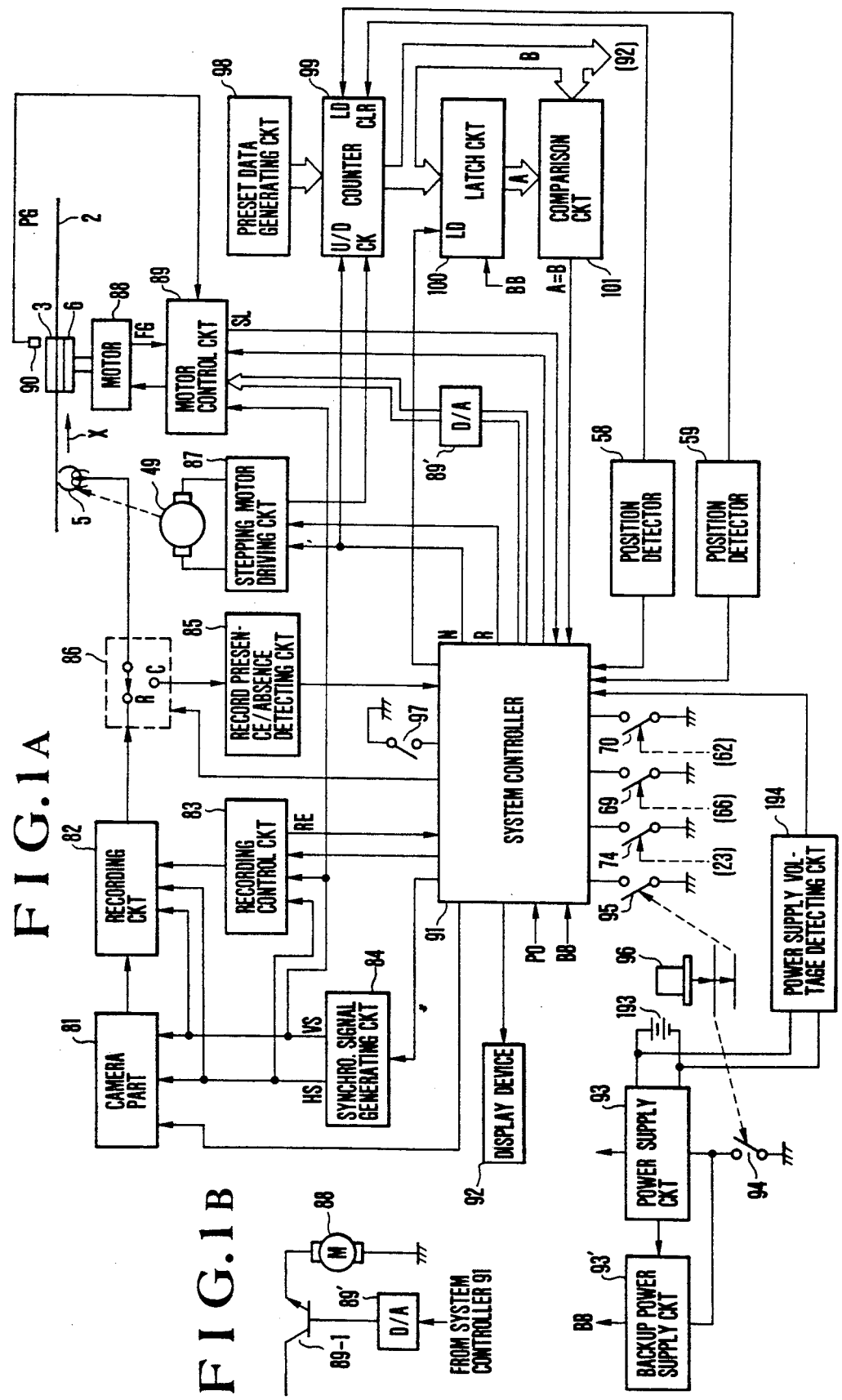
FIG. 1A is a circuit diagram showing the electric circuit of a recording apparatus arranged as an embodiment of this invention.
FIG. 1B is a circuit diagram showing a part of a motor control circuit included in FIG. 1A.

Referring to FIG. 1A, the electric circuit arrangement of a recording apparatus embodying this invention as an embodiment is as follows: In the case of the embodiment, this invention is applied to a still picture video recording apparatus. The illustration includes a magnetic recording disc 2; a center core 3 of the magnetic disc 2; a head 5 for recording a video signal on the magnetic disc 2; a stepping motor 49 for shifting the position of the head 5 in the radial direction of the disc 2; a carrier position detector 58 which is arranged to turn off by detecting that the head 5 is positioned at a recording track No. 0 located in the outermost peripheral part on the disc 2; another carrier position detector 59 arranged to turn off by detecting that the head 5 is positioned at a 51st recording track which is located in the innermost part on the disc 2; a jacket presence/absence detecting switch 69 arranged to detect whether the recording apparatus is loaded with a jacket which contains the magnetic disc 2 therein; an unloading detection switch 70 arranged to detect that the jacket is pulled out from a loaded state and to turn on from an OFF state when the jacket is replaced with a new jacket; an external cover locking completion detecting switch 74 which is arranged to detect an external cover provided for loading the jacket is closed and locked; and a camera part 81 which is arranged in a known manner to form a video signal. A recording circuit 82 is arranged to record a video signal produced from the camera part 81 on the disc 2 through the head 5. A recording control circuit 83 is arranged to control the recording circuit 82 in such a manner as to cause the recording circuit 82 to record one field or one frame portion of the video signal. A periodic signal generating circuit 84 is arranged to generate horizontal and vertical periodic signals HS and VS and to supply the output thereof to the camera part 81, the recording circuit 82, the recording control circuit 83 and a disc motor control circuit 89 which will be described later. The recording control circuit 83 produces a recording completion signal RE upon completion of recording by the head 5. A record presence/absence detecting circuit 85 serves as look-up means for detecting via the head 5 the presence or absence of a video signal previously recorded in each of recording positions on the disc 2. A changeover switch 86 is arranged to select the output of the recording circuit 82 when it is in one connecting position R and the input of the detecting circuit 85 when it is in another connecting position C. A stepping motor driving circuit 87 is arranged to drive a head shifting stepping motor 49. A disc rotating motor 88 is arranged to cause the disc 2 to rotate via a spindle 6. A disc motor control circuit 89 is arranged to control the motor 88 in the following manner in this specific embodiment: The motor 88 is controlled to cause the disc 2 to rotate at a predetermined speed (3600 or 1800 rpm in the case of the NTSC system) corresponding to the field or frame frequency of television and at a predetermined phase relative to the timing of the vertical periodic signal VS according to a reference speed signal produced from a reference oscillator included in the disc motor control circuit; a rotation speed signal FG obtained from the motor 88; the vertical periodic signal VS produced from the periodic signal generating circuit 84; and a disc rotation phase signal PG produced from a disc rotation phase detector 90 which is arranged to detect a magnetized pin buried in the center core 3 of the disc 2. Further, the control circuit 89 is arranged to produce a servo-lock-in signal SL when the motor 88 comes to rotate at the predetermined speed and at the predetermined phase.

Further, the motor control circuit 89 functions to vary a voltage to be applied to the motor 88 according to the analog output of a D/A converter 89'. A major portion of the electric energy supply capacity of a power supply circuit 93 is applied to the motor 88 when the analog output of the D/A converter 89' is at a first level which is relatively high to make the build-up time of the motor 88 as short as possible. In case that the analog output of the D/A converter 89' is at a second level which is lower than the first level, a relatively small electric energy is applied to the motor 88 for the purpose of protecting the power supply circuit 93, i.e. for a longer service life of a power supply battery 193.

FIG. 1B shows a part of the motor control circuit 89. The circuit 89 includes an NPN type power transistor 89-1. The base of the transistor 89-1 is connected to the output terminal of the D/A converter 89'. Digital data coming from a system controller 91 is converted into an analog voltage by the D/A converter 89'. When the analog voltage is at a high level, a voltage between the collector and emitter of the transistor 89-1 drops and a voltage to be applied to the motor 88 becomes high. If the analog voltage is at a low level, the voltage between the collector and emitter of the power transistor becomes high and the voltage to be applied to the motor 88 becomes low. The use of the NPN type power transistor may be replaced with a PNP type power transistor. Further, instead of using the power transistor as a pass transistor, the voltage dividing ratio of resistors may be arranged to be variable in case that the power supply voltage is arranged to be voltage divided by means of resistors.

As mentioned in the foregoing, the voltage to be applied to the motor 88 is controlled by controlling the data supplied from the system controller 91 to the D/A converter 89'. The control is accomplished in such a manner that the life of the power supply battery can be made longer in addition to shortening the build-up time of the operation of the motor 88. The D/A converter 89' is arranged to convert a digital value of data into an analog value as mentioned above. Servo control is accomplished over the motor speed jointly by the system controller 91, the D/A converter 89' and the motor control circuit 89. When the speed of the motor becomes lower than a predetermined speed, the digital value produced from the system controller is increased to have a higher voltage applied to the motor 88.

The system controller 91 is arranged to control the whole circuit system shown in FIG. 1A on the basis of the outputs of a recording trigger switch 95, a mode change-over switch 97, the cassette (or jacket) presence/absence detection switch 69, the cassette (or jacket) unloading detection switch 70, the external cover lock completion detecting switch 74 and the carrier position detectors 58 and 59; a recording completion signal RE from the recording control circuit 83; the servo-lock signal SL from the motor control circuit 89; and a power on signal PO which is obtained when the power supply is switched on.

A display device 92 includes light emitting elements. A power supply circuit 93 includes a battery. A backup (or auxiliary) power supply circuit 93' includes a capacitor. The circuit system further includes a power supply switch 94; a recording trigger switch 95; and a trigger button 96. The trigger button 96 is arranged to turn on the power supply switch 94 when the button is pushed down to a first step thereof and to turn on the recording trigger switch 95 when it is pushed down to a second step thereof. With the trigger button 96 pushed down to the first step, the power supply is switched on to activate the motor 88. A preparatory operation for recording begins. The mode change-over switch 97 is provided for selection between a single shooting mode in which one field or one frame portion of the video signal is recorded when the trigger switch 95 is operated once and a continuous shooting mode in which a recording operation continuously repeats as long as the trigger switch 95 is kept in an ON state. The mode change-over switch 97 is turned off to select the single shooting mode and turned on to select the continuous shooting mode. The arrangement described may be changed to have the trigger button 96 arranged to be used only for operating the trigger switch 95 and the power supply switch 94 arranged to be operatable by some other member.

The record presence/absence detecting circuit 85 is arranged to detect the presence or absence of an RF signal if, for example, the recorded signal is an FM signal and to produce a high level signal in the event of the presence of some previous record. The backup power supply circuit 93' is arranged to have the capacitor thereof charged with electric energy by receiving a power supply from the power supply circuit 93 when the power supply switch 94 turns on. When the switch 94 is turned off, the charged electric energy is supplied from the backup power supply circuit 93' to applicable circuits including, for example, at least the system controller 91 and a latch circuit 100. The circuit 93' has a capacity of lasting scores of minutes to several hours.

A counter 99 is arranged to count driving pulses coming from the stepping motor driving circuit 87. The counter 99 counts upward when the stepping motor 49 is driven to rotate forward by a control signal from the controller 91 and counts downward when the motor 49 is driven to rotate backward (in the direction reverse to the direction of arrow X of FIG. 1. The content of the counter 99 is arranged to be cleared by an OFF signal coming from the carrier position detector 58 and to be preset by data "51" produced from a preset data generating circuit 98.

A latch circuit 100 is arranged to latch the content of the counter 99 in response to a load instruction produced from the controller 91. The latch circuit 100 serves as means for electrically storing the result of look-up for the presence or absence of a previous record. The circuit 100 is receiving a power supply also from the backup power supply circuit 93'. A comparison circuit 101 is arranged to compare the content A of the latch circuit 100 and the content B of the counter 99. The output of the comparison circuit representing a result of comparison A=B (a high level output from a terminal A=B) is arranged to be supplied to the controller 91.

A battery 193 serves as the power source of the power supply circuit 93. A power supply voltage detecting circuit 194 is arranged to detect the voltage of the battery 193. When a current is supplied from the battery 193 and the power supply circuit 93, the voltage detecting circuit 194 detects the power supply voltage to produce a high level output if the detected power supply voltage is higher than a predetermined value and a low level output when the detected voltage is lower than the predetermined value. The output of the detecting circuit 194 is supplied to the system controller 91. If the output level of the power supply voltage detecting circuit 194 is at a low level when the motor 88 is started, the system controller 91 supplies the D/A converter 89' with digital data of such a small value as "0100", for example. This causes the converter 89' to supply the motor control circuit 89 with an analog value at the above-stated second level for a longer life of the battery 193.

Further, in starting the motor 88 for automatically shifting the position of the head 5 to a nonrecorded position on the disc 2 in a manner as will be described later, the system controller supplies the D/A converter 89' also with data of a small digital value to have the analog value supplied to the motor control circuit 89 at the second level to ensure thereby a longer life of the battery 193.

In case that the head 5 has already been automatically shifted by an automatic positioning operation to a nonrecorded position on the disc 2 when the motor 88 is to be started, the system controller 91, temporarily supplies the D/A converter 89' with a large digital value such as "1111" to have the analog value supplied at the above-stated first level to the motor control circuit 89, so that the build-up time required by the motor 88 can be made as short as possible. However, with a discrimination made between the high and low levels of the output of the power supply voltage detecting circuit 194 before complete building up of the rotating speed of the motor 88, if the level is found low, the controller determines the battery 193 to be in a weak state having a diminished capacity. In that event, the digital value to be applied to the D/A converter 89' is adjusted to a small value such as "0100", so that the analog value is supplied at the above-stated second level to the motor control circuit 89 and thus the life of the battery 193 can be lengthened.

Figure 2:
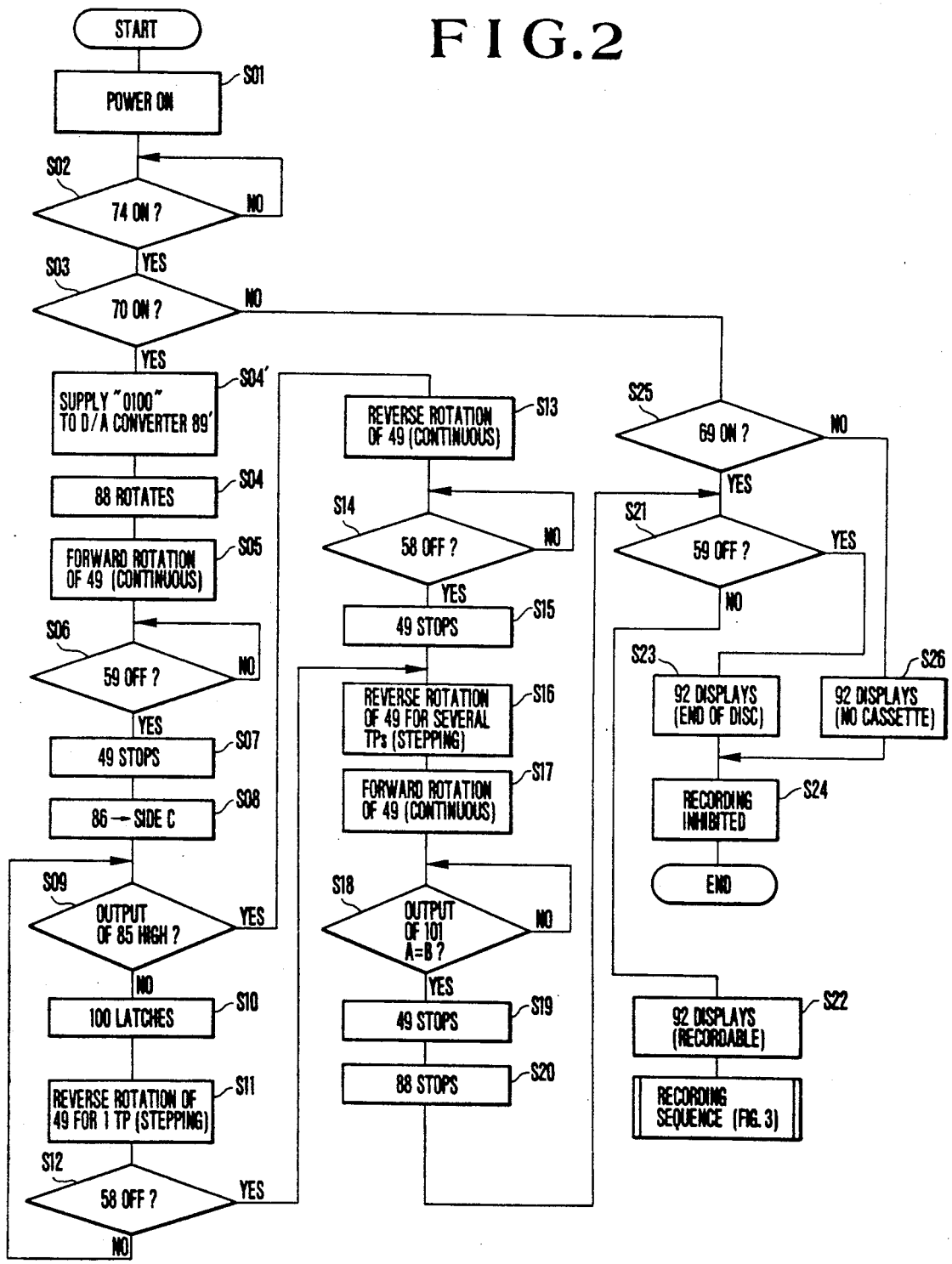

The system controller 91 is mainly composed of a microcomputer, etc. and is arranged to receive a power supply also from the backup power supply circuit 93'. The controller 91 operates as described below with reference to flow charts:

Referring to FIG. 2, when the power supply switch 94 is turned on with the trigger button 96 pushed down to the first step thereof, a preparatory operation is performed for recording as follows: With the power supply switched on at a step S01, the system controller 91 makes a check at a step S02 to see if the external cover lock completion detecting switch 74 is in an ON state.

If not, the flow of operation of the controller waits until the switch turns on. If it is found on, the controller checks the jacket (or cassette) unloading detection switch 70 at a step S03 to see if it is in an ON state. If the switch is on, it indicates that a jacket having the magnetic disc 2 has been replaced (unloading and loading) with a new jacket. In that event, therefore, an automatic positioning operation is performed for automatically shifting the disc 2 to a nonrecorded position on the disc 2 in the following manner:

If the head 5 is shifted over the disc 2 while the disc is in repose, the recording surface of the disc 2 might be damaged by the movement of the head. To avoid that, the controller 91 instructs the disc motor control circuit 89 to cause the motor 88 to rotate at a step S04.

Further, at a step S04' prior to the step S04, the digital value "0100" is applied to the D/A converter 89' to have the analog output of the converter applied to the motor control circuit 89 at the second level which is lower than the first level. By this arrangement, the motor 88 is started with importance attached to the preservation of the life of the battery 193 rather than to a quicker building up speed of the motor 88 as mentioned in the foregoing. In other words, the build-up speed of the motor 88 does not have to be so high in automatically shifting the head 5 into its initial position through a flow of operation which will be described later. In view of this, the step S04' is provided for lessening the load on the battery 193 by lowering the voltage to be applied to the motor 88.

Following this, at a step S05, the controller instructs the stepping motor driving circuit 87 to cause the stepping motor 49 to continuously rotate forward. Then, the continuous forward rotation of the stepping motor 49 takes place (at the step S05).

Step S06: The head 5 then becomes to be continuously shiftable in the direction of arrow X shown in FIG. 1A. During this shifting process, the controller repeats checking the carrier position detector 59 to see if the detector 59 turns off with the head 5 reaching the 51st track position mentioned in the foregoing.

Step S07: When the detector 59 turns off, the controller 91 instructs the motor driving circuit 87 once again to bring the motor 49 to a stop. With the carrier position detector 59 having turned off, the counter 99 is preset by data "51" produced from the preset data generating circuit 98. The content of the counter 99 thus becomes "51".

Step S08: The controller 91 then shifts the connecting position of the change-over switch 86 to its terminal c.

Step S09: Under this condition, a check is made to see the output level of the record presence/absence detecting circuit 85.

Step S10: If the output level is not high, the controller 91 causes the latch circuit 100 to latch the output of the counter 99.

Step S11: An instruction is produced to have the stepping motor 49 make reverse rotation by the one step (corresponds to the width of one track on the magnetic disc (or sheet) 2.

Step S12: This action is repeated until either the output level of the detecting circuit 85 becomes high or the carrier detector 58 comes to turn off with the head 5 reaching the track No. 0.

Further, the record presence/absence detector 85 detects the presence or absence of any recorded signal on the disc 2 on the basis of a signal picked up by the head 5. The detector 85 produces a high level signal if there is any recorded signal and a low level signal in the event of absence of such a recorded signal. At that time, the counter 49 down counts by one at every step of the reverse rotation of the stepping motor 49.

Step S13: When the output level of the detecting circuit 85 becomes high at the step S09, the system controller 91 produces an instruction for continuous reverse rotation of the motor 49. During this process, at a step S14, a check is made to find if the carrier position detector 58 has turned off.

Step S15: When the carrier position detector 58 comes to turn off, an instruction is issued to bring the motor 49 to a stop. The head 5 is then positioned at the track No. 0 by this process. Then, the content of the counter 99 is cleared and becomes "0". Meanwhile, at this time, data representing the number of a track (non-recorded) located next to the last recorded track as viewed from the track No. 0 on the outer peripheral side of the disc 2 is stored at the latch circuit 100. After the motor 49 is brought to a stop at the step S15, the flow of operation of the controller 91 proceeds to a step S16 to issue an instruction for reverse rotation of the motor 49 by a number of steps corresponding to several track pitches (hereinafter referred to as TPs). In this instance, in case that the detector 58 turns off at the step S12, the flow of operation comes directly to the step S16 without performing the steps S13 to S15. In that case, the content of the latch circuit 100 has become "1". Meanwhile, the content of the counter 99 has of course been cleared and becomes "0" also in that case. Further, in case that a 50th track has already been recorded, the flow of operation makes one round trip of steps S09-S10-S11-S12-S09 before coming to the step S13. Then, the content of the latch 100 becomes "51".

Step S16: The system controller 91 instructs the driving circuit 87 to cause the motor 49 to make stepwise reverse rotation for shifting the head 5 several TPs in the direction reverse to the direction of arrow X. As a result of this, a device which is not shown brings the jacket (cassette) unloading detection switch 70 back to its OFF state. After that, therefore, the detection switch 70 turns on when the jacket is replaced to enable the controller to detect the replacement of the jacket with another.

Step S17: After the stepping motor 49 is caused to reversely rotate to an extent corresponding several TPs, the controller 91 issues an instruction to cause the motor 49 to continuously rotate forward for shifting the head 5 in the direction of arrow X.

Step S18: During this process, the comparison circuit 101 is checked for the output state of A=B thereof. With the stepping motor 49 rotating forward, the counter 99 up counts to increase its content one by one from "0". The content of the counter 99 thus always indicates the position of the head 5 on the disc 2 thus indicating a current track. The comparison circuit 101 produces a high level signal from the terminal A=B when the number assigned to the track to which the head 5 is opposed comes to coincide with the content of the latch circuit 100. Therefore, when the A=B terminal output level of the comparison circuit 101 becomes high, the controller 91 issues in response thereto an instruction to bring the rotation of the motor 49 to a stop (Step S19). Then, in response to this instruction, the head 5 is positioned at a track the position data of which is kept at the latch circuit 100. In otherwords, the head is thus positioned at a nonrecorded track located next to the last of recorded tracks as viewed from the track No. 0.

Step S20: The controller 91 issues an instruction to bring the disc motor 88 to a stop.

Step S21: After this, a check is made to see if the carrier position detector 59 has turned off. If not, the display device 92 is caused to make a display indicating that recording in the 50th track of the disc 2 has been completed (the end of the disc) at a step S23.

Step 24: Recording is inhibited.

In case that the jacket unloading detection switch 70 is found not in an ON state but is off at the previous step S03 thus indicating either that the jacket 1 has not been replaced (unloaded) or that the apparatus has not been loaded with any jacket, the controller 91 further checks, at a step S25, the jacket presence/absence detecting switch 69 to see if it has turned on. If the switch 69 is found to have turned on indicating that the apparatus has been loaded with a jacket containing the magnetic disc 2, the flow of operation comes back to the step S21. If the switch 69 is found not in an ON state thus indicating the absence of the jacket, the controller 91 causes the display device 92 to display the absence of jacket at a step S26. Then, the controller 69 inhibits recording (Step S22).

The embodiment thus performs a preparatory operation for recording with the driving current supplied to the motor 89 lowered at the step S04'.

Figure 3:
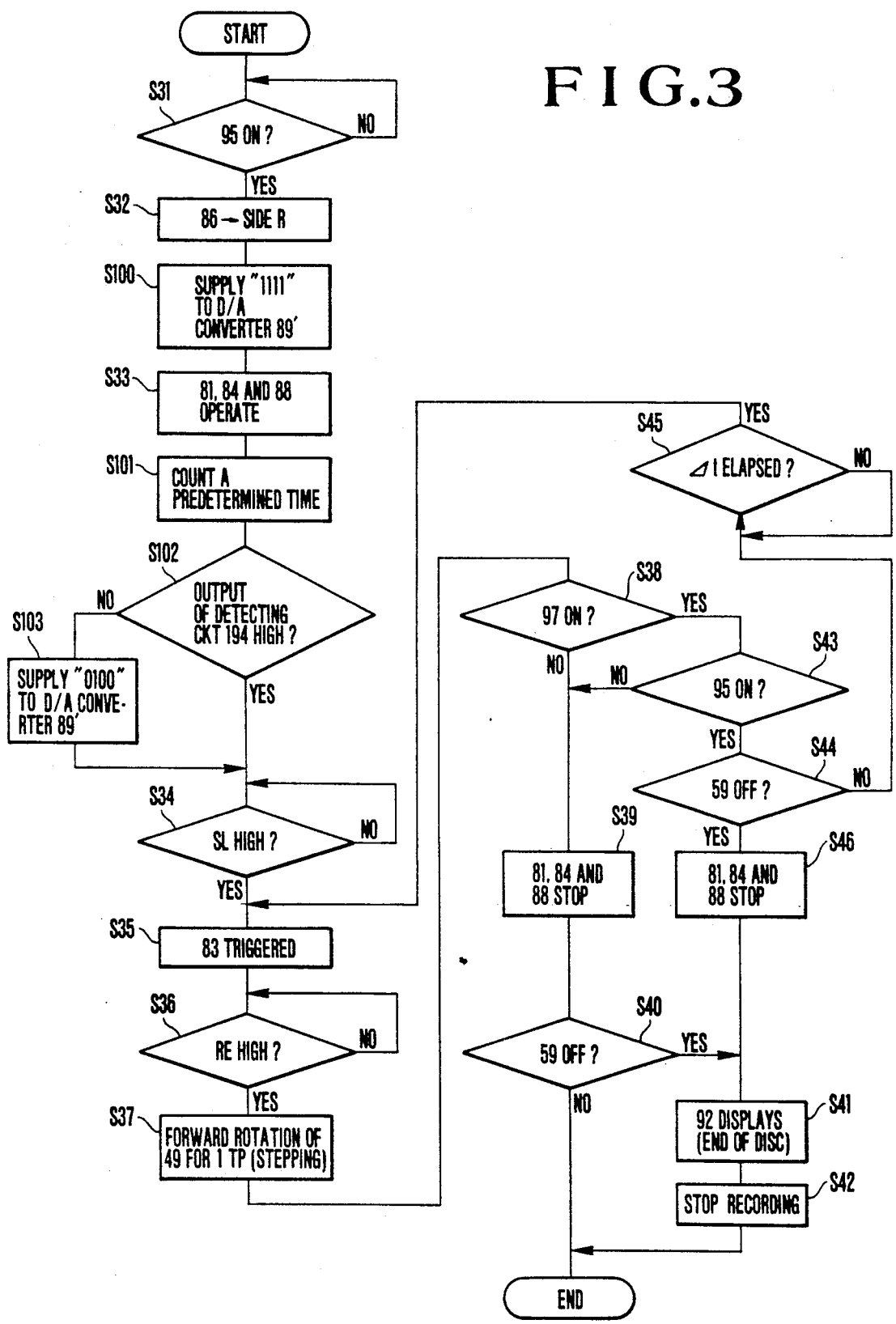
FIG. 3 is a flow chart showing a recording operation to be performed by the controller 91 when a recording trigger switch 95 is turned on after completion of the preparatory operation of FIG. 2.

After completion of the preparatory operation for recording, video signal recording and particularly control over the building-up speed of the motor 88 are performed with the recording trigger switch 95 turned on. FIG. 3 shows that operation in a flow chart.

Step S31: With the preparatory operation for recording having been completed as mentioned above, the controller 91 continuously repeats checking the recording trigger switch 95 to see if the switch 95 is turned on with the trigger button 96 pushed down to its second step position.

Step S32: When the trigger switch 95 is turned on, the controller 91 shifts the connecting position of the change-over switch 86 to its terminal R.

Step S33: Following this, the camera part 81 and the synchronizing signal generating circuit 84 are actuated. At the same time, the motor control circuit 89 is instructed to cause the disc motor 88 to rotate. Further, before actuating the motor 88 at the step S33, data "1111", is supplied to the D/A converter 89' to minimize the build-up time of the motor 88 by applying to the motor 88 a major portion of the electric energy available from the power supply circuit 93.

Step S100: A time loss before actual start of recording thus can be minimized by this arrangement.

Step S101: A very short period of time, say, some scores of msec to several hundreds of msec is counted after actuation of the motor 88 at the step S33. After the lapse of this waiting time, the operation proceeds to a step S102.

Step 102: The output level of the power supply voltage detecting circuit 194 is checked to see if it is at a high level. If not, the capacity of the battery 193 is determined to have lowered and data "0100" is supplied to the D/A converter 89' at a step S103.

Step 103: The voltage to be applied to the motor 88 is thus lowered for a longer life of the battery 193. Meanwhile the camera part 81 comes to produce a video signal in synchronism with synchronizing signals HS and VS produced from the synchronizing signal generating circuit 84. The recording circuit 82 then processes (frequency modulation, etc.) the video signal coming from the camera part 81 into a recording signal. (Under this condition, however, a recording gate included in the recording circuit 82 is in an OFF state. Therefore, although the head 5 is in connection with the recording circuit 82 via the change-over switch 86, no recording is performed.) Meanwhile, the motor control circuit 89 controls the motor 88 to have the disc 2 rotated at a speed corresponding to a field or frame frequency and at a predetermined phase relative to the vertical synchronizing signal VS. When the motor 88 comes to rotate at the prescribed speed and phase, a servo-lock-in signal SL is produced at a high level.

Step S34: In the meantime, after giving the instruction to operate the motor 88, the controller 91 repeats checking for a high level of the servo-lock-in signal.

Step S35: When the level of the servo-lock-in signal SL becomes high, the controller 91 immediately applies a recording trigger signal to the recording control circuit 83. In response to this, the recording control circuit 83 turns on the recording gate of the recording circuit 82 to keep the gate in an ON state for one field or frame period including a first vertical synchronizing signal VS produced immediately after the recording trigger signal on the basis of the synchronizing signals HS and VS produced from the synchronizing signal generating circuit 84. Then, one field or frame portion of the recording signal is supplied via the change-over switch 86 to the head 5. The signal is recorded on the disc 2 while it is rotated just one turn by the motor 88. In this instance, the vertical synchronizing signal VS is recorded in a predetermined rotational position relative to the magnetized pin of the center core 3 which is not shown.

Upon completion of the recording of one field or frame portion of the signal, the recording control circuit 83 produces a recording completion signal RE at a high level. Meanwhile, the controller 91 repeats checking this recording completion signal RE for a high level thereof after the recording trigger signal is produced (Step S36).

Step S37: When the level of the signal RE becomes high, the controller 91 instructs the motor driving circuit 87 to have the head 5 shifted to an extent of 1 TP in the direction of arrow X into a next recording position by causing the stepping motor 49 to make stepwise forward rotation. The counter 99 then up counts by one.

Step S38: The controller 91 then checks the mode change-over switch 97 to see if the switch has been turned on.

Step S39: If not, it indicates that the single shooting mode has been selected. Then, the camera part 81 and the synchronizing signal generating circuit 84 are rendered inoperative and the motor control circuit 89 is instructed to bring the disc motor 88 to a stop (Step S39).

Step S40: The controller 91 checks the detector 59 to see if it has been turned off by the movement of the head 5.

Step S41: If it is found in an OFF state, the display device 92 is caused to make a display indicating the end of the disc.

Step 42: Further recording is inhibited.

After the step S41, with the switch 97 in the OFF state indicating the selection of the single shooting mode, one field or frame portion of the signal is recorded in each of different positions on the disc 2 every time the recording trigger switch 95 is turned on as long as the detector 59 does not turn off. In case that the mode change-over switch 97 is found in an ON state at the step S38 (thus indicating selection of a continuous shooting mode), the controller 91 checks the trigger switch 95 to see if it has been turned on (Step S43).

Step S44: If the switch 95 is found in an ON state, the controller further checks the detector 59 to see if it has been turned off.

Step S45: If not, the operation waits for the lapse of a predetermined period of time Δt required for determining a speed or rate for continuous recording. After the lapse of this waiting time, the flow of operation comes back to the previous step S35 to once again trigger recording. In case that the detector 59 is found in an OFF state at the step S44, the operation comes to a step S46.

Step S46: In the same manner as in the step S39, the camera part 81 and the synchronizing signal generating circuit 84 are rendered inoperative. At the same time, an instruction is issued to bring the motor 88 to a stop. The flow of operation then shifts to the step S41.

In the case where the switch 97 is in an ON state thus indicating the selection of the continuous shooting mode, one-field or one-frame portions of the video signal are thus continuously recorded in different positions on the disc 2 one after another at a predetermined rate of speed through the processes of operation described above as long as the recording trigger switch 95 remains in its ON state until the detector 59 comes to turn off. Further, in this case, the rate of speed for the continuous shooting operation is variable by adjusting the waiting time Δt at the step S45.

Further, during this recording operation, the counter 99 up counts every time the head 5 shifts to a next track after completion of recording in one track. The content of the counter 99 is thus indicative of the current position of the head 5. It is preferable, therefore, to have the output of the counter 99 supplied to the display device 92 to allow the display device to make a display indicating the current position of the head 5.

This embodiment has the following advantageous feature: In positioning the head 5 in a recording position on the disc 2 during the preparatory operation for recording, a check is made to find the presence or absence of any record existing in each recording position starting with the last recording position, i.e. the 50th track, on the disc 2 in the order reverse to the order in which recording tracks are designated for recording. Then, a nonrecorded position located one TP distance before a first detected recorded position, that is, a nonrecorded position immediately following the last recorded track as counted in the order of the numbers assigned to recording tracks is stored at the latch circuit 100. The head 5 is set in this position. In the event of a disc which has been recorded halfway and some of intermediate tracks has been erased, the head 5 is never positioned at such an erased track. Therefore, the embodiment is free from any of the inconveniences that result from recording in such an erased track. For example, such inconveniences include necessity to make a discrimination between the presence and absence of existing record every time the head 5 is shifted from one recording position to another; and an excessively long time required before a next recording operation becomes possible. In the latter event, an important recording chance might be missed or continuous recording cannot be adequately accomplished.

Figure 4:
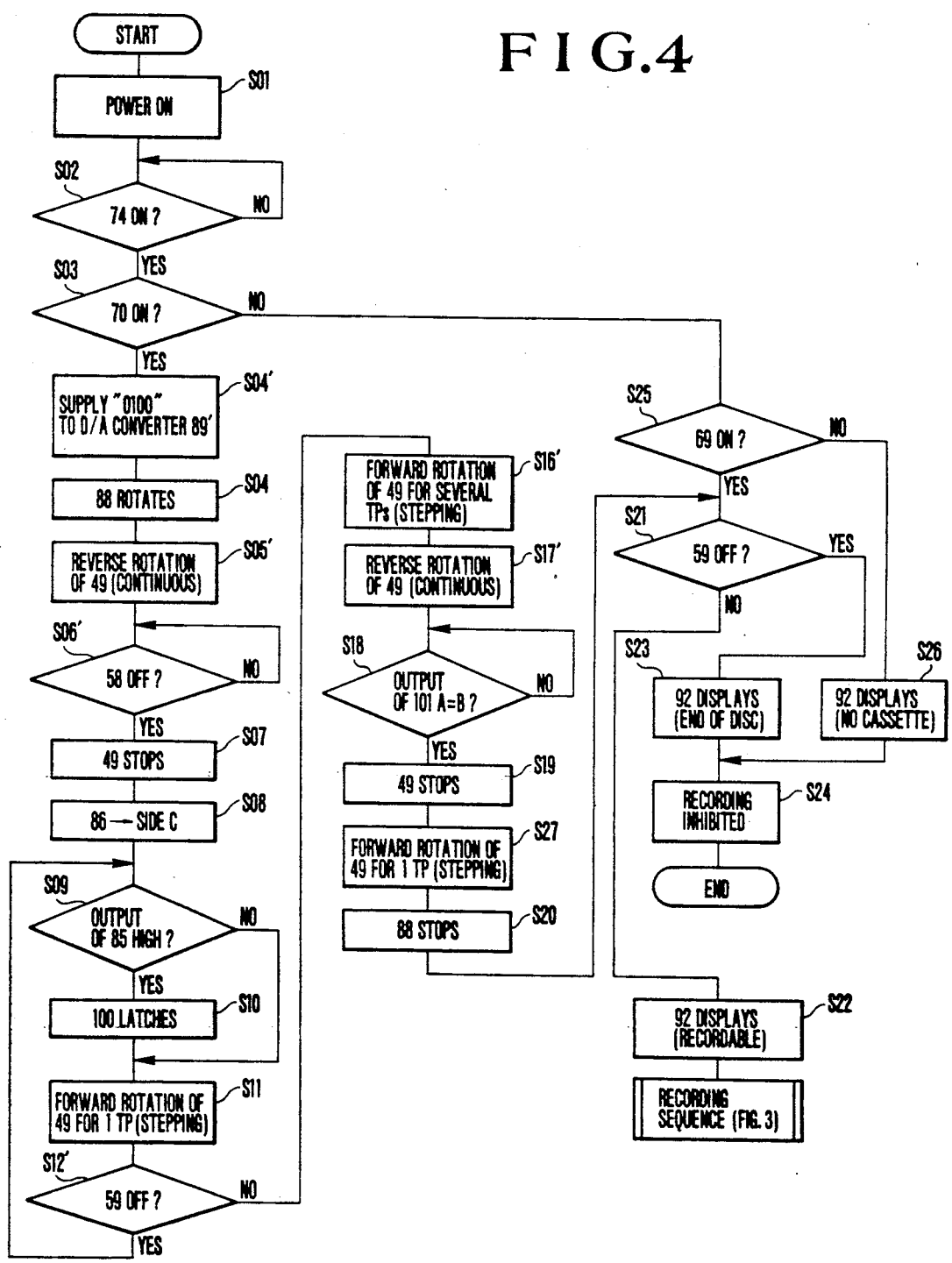
FIG. 4 is a flow chart showing an example of modification of the operation shown in FIG. 3.

The search or look-up process for presence or absence of existing record on the disc 2 as described in the foregoing is decrementally performed from the 51st track. This arrangement, however, may be changed to incrementally make the search from the track No. 0 instead of from the 51st track. In that instance, the control operation is performed according to a flow of operation as shown in FIG. 4. In FIG. 4, the same steps as those of FIG. 2 are indicated by the same step numbers and other steps are indicated by corresponding step numbers with apostrophes. The operation shown in FIG. 4 is as follows:

Step S04: The controller 91 gives an instruction to rotate the disc motor 88.

Steps S05' to S07: After that, the controller 91 causes the stepping motor 49 to continuously rotate in the reverse direction until the carrier position detector 58 comes to turn off. The motor 49 is brought to a stop when the detector 58 comes to turn off. The head 5 is thus set at the track No. 0.

Step S08: The controller 91 shifts the connecting position of the switch 86 to its side C.

Step S09: A check is made for the output level of the record presence/absence detecting circuit 85.

Step S10: If the output is at a low level, the motor 49 is directly caused to make forward rotation to an extent corresponding to one TP. If it is at a high level, the motor 49 is caused to make the forward rotation after the output of the counter 99 is latched by the latch circuit 100.

Step S12': This process is repeated until the carrier position detector 59 comes to turn off with the head 5 having reached the 51st track. Therefore, when the head 5 comes to the 51st track, the last recording track number is left at the latch circuit 100.

Step S16': With the detector 59 having turned off, the controller 91 allows the motor 49 to further rotate forward to an extent corresponding to several TPs. This process is similar to the step S16 of FIG. 2. This step is provided for the purpose of resetting a switch which is arranged to mechanically store information about whether the jacket having the magnetic disc 2 has been replaced or not.

Step S17': The controller 91 gives an instruction to cause the stepping motor 49 to continuously rotate in the reverse direction.

Step S18: During the reverse rotation of the motor 49, a check is made for the output level of the terminal A=B of the comparison circuit 101.

Step S19: The motor 49 is brought to a stop when the A=B output level becomes high. At that moment, the head 5 is located at the last recorded track on the disc 2.

Step S27: Therefore, the controller 91 gives an instruction to cause the motor 49 to make further stepwise forward rotation to a degree corresponding to one TP. As a result of this, the head 5 is set in a non-recorded position immediately following the last recorded track. After this, the process of operation subsequent to the step S20 is performed in a manner similar to the case shown in FIG. 2.

In the embodiment and the modification example described in the foregoing, the recording tracks on the disc 2 are numbered in the order of their locations from the outer circumference toward the center of the disc 2. This numbering order may be reversed, i.e. from the center toward the outer circumference. In that case, the flows of operations shown in FIGS. 2, 3 and 4 are somewhat changed accordingly.

Figure 5:
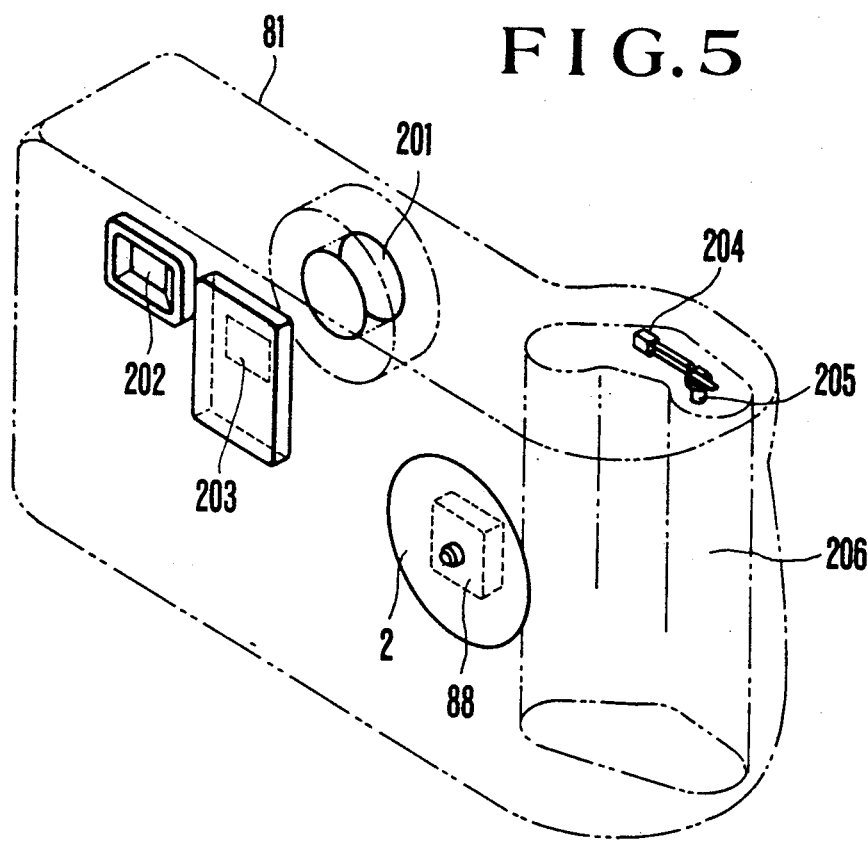
FIGS. 5, 6 and 7 respectively show the appearance of the recording apparatus of FIG. 1A with some parts of the same apparatus and the appearance of an AC adapter 206 and that of a battery pack 208 in oblique views.
Figure 6:
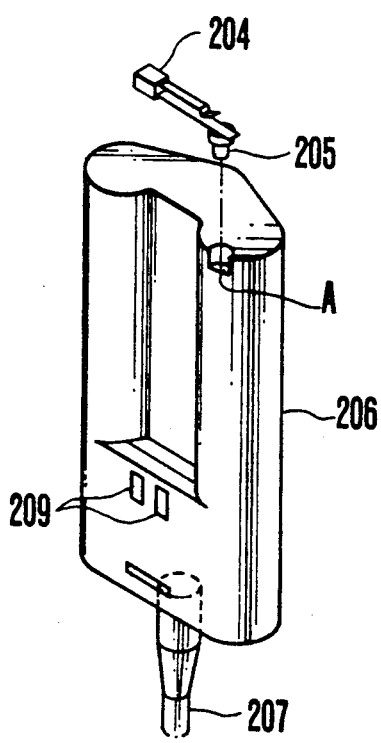
Figure 7:
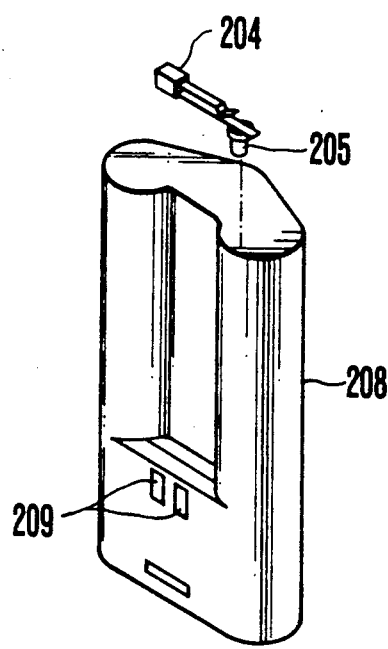

In the embodiment described, the digital value data to be supplied from the system controller 91 to the D/A converter 89' is controlled at each of different points of time including the time for starting the motor 88 during the automatic positioning process for bringing the head 5 into a nonrecorded position on the disc 2; the time for starting the motor 88 when the head 5 has been automatically positioned beforehand; and the time of detecting the voltage of the battery 193 immediately after the start of the motor 88 with the head 5 having been automatically positioned. With the digital value controlled in this manner, the voltage applied to the motor 88 is controlled accordingly. This mode of control is necessary in the event of relatively low capacity of the battery 193. Such control is not always necessary in case that the use of the battery 193 is replaced, for example, with a commercial power source of AC, 100 V, with an AC adapter arranged to convert it into a DC voltage equivalent to the battery 193. Therefore, in the case of the use of an AC adapter, the digital value does not have to be adjusted to "0100" in starting the motor 88 but a digital value of "1111" can be used to ensure quick building up of the motor operation. FIGS. 5, 6 and 7 show an embodiment which is arranged to perform the control operation in that manner. FIG. 5 is an oblique view showing the appearance and some inside parts of the recording apparatus shown in FIG. 1A. FIGS. 6 and 7 are oblique views respectively showing the appearance of an AC adapter 206 and that of a battery pack 208. In FIG. 5, the parts performing the same functions as those of corresponding parts of FIG. 1A are indicated by the same reference numerals and the details of them are omitted from the following description:

Referring to FIGS. 5, 6 and 7, the embodiment includes a photo-taking lens 201; a view finder part 202; a CCD which is arranged to convert an image of a photographing object formed by the photo-taking lens 201; a discriminating switch 204 which is arranged to make a discrimination between the different units shown in FIGS. 6 and 7; and a detection pin 205 which is arranged to change the state of the discriminating switch 204. The position of the pin changes by engaging the unit shown in FIG. 6 or 7 when the unit is inserted into a battery box chamber 206. More specifically, the position of the detection pin 205 changes to turn off the discriminating switch 204 when the unit is the AC adapter having an identifying recess A as shown in FIG. 6 and to turn on the switch 204 when the unit in question is the battery pack which does not have the recess A. These illustrations further show a power supply cord 207; and contacts 209 arranged for supplying electric energy from the AC adapter 206 or the battery pack 208 to corresponding contacts which are not shown but are arranged within the battery box chamber 206.

In case that the battery pack 208 of FIG. 7 is inserted into the battery box chamber 206 of FIG. 5 to turn on the discriminating switch 204, the embodiment performs operations in the manner as has been described with reference to FIGS. 1A to 4 in the foregoing. Meanwhile, when the discriminating switch 204 is turned off with the AC adapter 206 of FIG. 6 inserted into the chamber 206, the embodiment operates as follows: At the step S04' shown in FIGS. 2 and 4, the digital value of "1111" instead of the value "0100" is supplied to the D/A converter, so that the build-up time in starting the motor 88 can be shortened to a maximum degree. Since the capacity of the AC adapter 206 is large, the power supply voltage never drops even at the build-up time of the motor. In this case, therefore, the steps S102 and S103 in the part of flow of operation from the step S101 to the step S103 are skipped and the operation shifts from the step S101 to the step S34.

Therefore, in the embodiment shown in FIGS. 5 to 7, the kind of the power source is discriminated and the build-up speed of rotation of the motor 88 is always quickened in the event of a power source of large capacity such as in the case of the AC adapter. In the case of a power source of relatively small capacity such as in the case of a battery, the motor 88 is allowed to have a fast build-up speed only at the start of recording, so that a load on the battery can be alleviated for a longer life of the battery.

In this specific embodiment, the external shape of the power source is arranged to vary with the kind of it for the purpose of identification by the input switch arrangement. However, the same purpose can be attained in some different manner. For example, the kind of the power source can be detected by providing an electric conductive pattern on the casing of the power source shown in FIG. 6 or 7 and by electrically detecting the pattern. While the digital data to be supplied from the system controller 91 to the D/A converter is shown in two different values "1111" and "0100", the data is of course not limited to these values but may be set at any other suitable values.

In the embodiment, the invention is applied to a still picture video recording apparatus with a camera part arranged in one unified body therewith as an integral part thereof. However, the camera part 81 may be discretely arranged. Further, in addition to the use of the battery as the power source, the recording apparatus may be arranged to directly use a commercial power source without using the adapter. The recording apparatuses to which this invention is applicable are not limited to video signal recording apparatuses but include also other apparatuses for recording audio signals, data and information. The recording method is also not limited to magnetic recording. The recording medium is not limited to a disc shaped medium. The medium may be in a drum or tape shape, such as the medium used, for example, by an 8-track audio recorder. While a magnetic disc rotating motor is used as driving means for changing the relative positions of the recording medium and the recording head, this motor may be replaced with some other driving means in cases where the recording medium is in a drum or tape shaped. The driving means may be arranged to move the head instead of moving the recording medium.

The system controller 91 is arranged to be operated by a software to have two different starting modes including a first starting mode in which the electrical energy supplied to the driving means in starting it is limited to a first value; and a second starting mode in which the driving means starting electric energy is limited to a second value which is lower than the first value. However, this software arrangement of course may be replaced with some hardware circuit arrangement. Further, in this embodiment, the voltage to be applied to the motor 88 is arranged to always high by selecting the first starting mode in the event of use of the AC adapter. However, this arrangement may be changed to select the first starting mode only in shifting the relative position between the recording medium and the recording/reproducing head for the actual start of recording and to select the second starting mode on other motor starting occasions even in the event of the AC adapter. Further, in the embodiment, the electric energy capacity of the power supply means is arranged to be detected by the power supply voltage detecting circuit 194 which supplies the result of detection to the system controller 91 at the steps S100 and S102 as shown in FIG. 3. However, in case that the electric energy supply means is arranged to generate the electric energy by a chemical reaction as in the case of a dry cell or a secondary battery, the detection circuit 194 may be replaced with some means for detecting the temperature of the energy supply means, because the electric energy supply capacity increases and decreases according as the temperature increases or decreases. Some other suitable means may be employed also for the same detecting purpose.

As described in the foregoing, the embodiment includes the arrangement to effect change-over in starting the driving means for varying the relative positions of the recording medium and the recording head between the first starting mode in which importance is attached to the build-up speed of the driving means and a second starting mode in which importance is attached to electric energy saving. In accordance with the arrangement with the arrangement of the embodiment, the optimum starting mode is automatically selected in respect to the electric energy supply capacity of the electric energy supply means. Therefore, unlike the conventional arrangement, the embodiment is free from any electric energy supply shortage which results from repeatedly quickening the build-up speed of the motor and which thus causes the malfunction of other devices receiving the electric energy from the same supply means. In the case of a power source of large capacity, the embodiment always selects the first starting mode in which importance is attached to the build-up speed of rotation of the motor. In the event of a power source of a small capacity, the second starting mode is selected with importance attached to electric energy saving. The embodiment is thus capable of appositely carrying out control according to the kind of the electric energy supply means.

Figure 13:
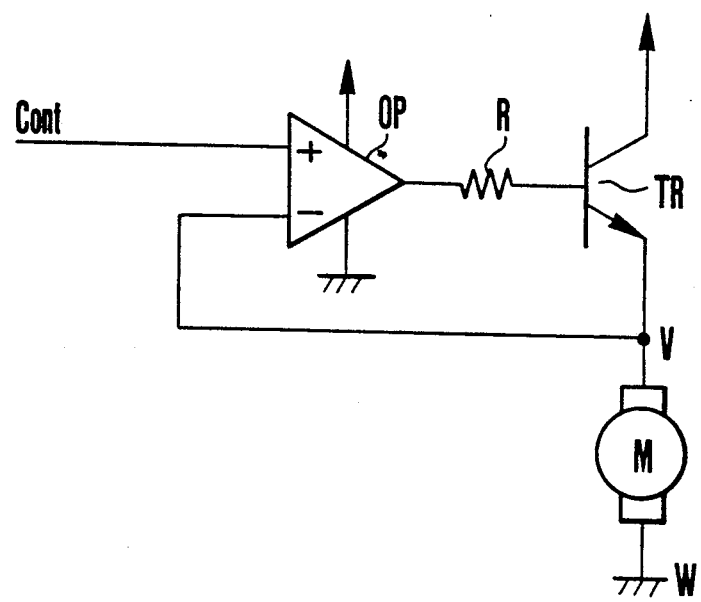
FIG. 13 is a circuit diagram showing the arrangement of a known motor control circuit.

The embodiment is arranged as described in the foregoing to control the voltage to be applied to the motor 88 by using the transistor 89-1 for the D/A converter shown in FIG. 1B. FIG. 13 shows an example of such a motor control circuit, though the drawing number is out of order.

Referring to FIG. 13, the motor control circuit is arranged as follows: The illustration includes a motor M; a transistor TR; a resistor R; and an operational amplifier OP. The inverting input terminal of the amplifier OP is connected to the motor M. In case that the speed of the motor M is to be changed by changing the level of a control signal Cont which is supplied to the non-inverting input terminal of the operational amplifier OP, it has been the conventional arrangement to increase the level of the control signal Cont for a higher rotating speed of the motor M and to decrease the signal level for a lower motor rotating speed.

In the control circuit arranged as described above, the motor M can be allowed to rotate at a high speed or the rotation of the motor can be allowed to build up in a very short period of time with an electric energy loss at the transistor TR minimized by increasing the base current of the transistor TR which is under control of the operational amplifier OP and thus by increasing the voltage to be applied to the motor M. However, adoption of such arrangement results in a complex circuit even if it is possible. Besides, the output current of the operation amplifier OP is limited. It has been, therefore, difficult to sufficiently raise the voltage to be applied to the motor M.

Figure 8:
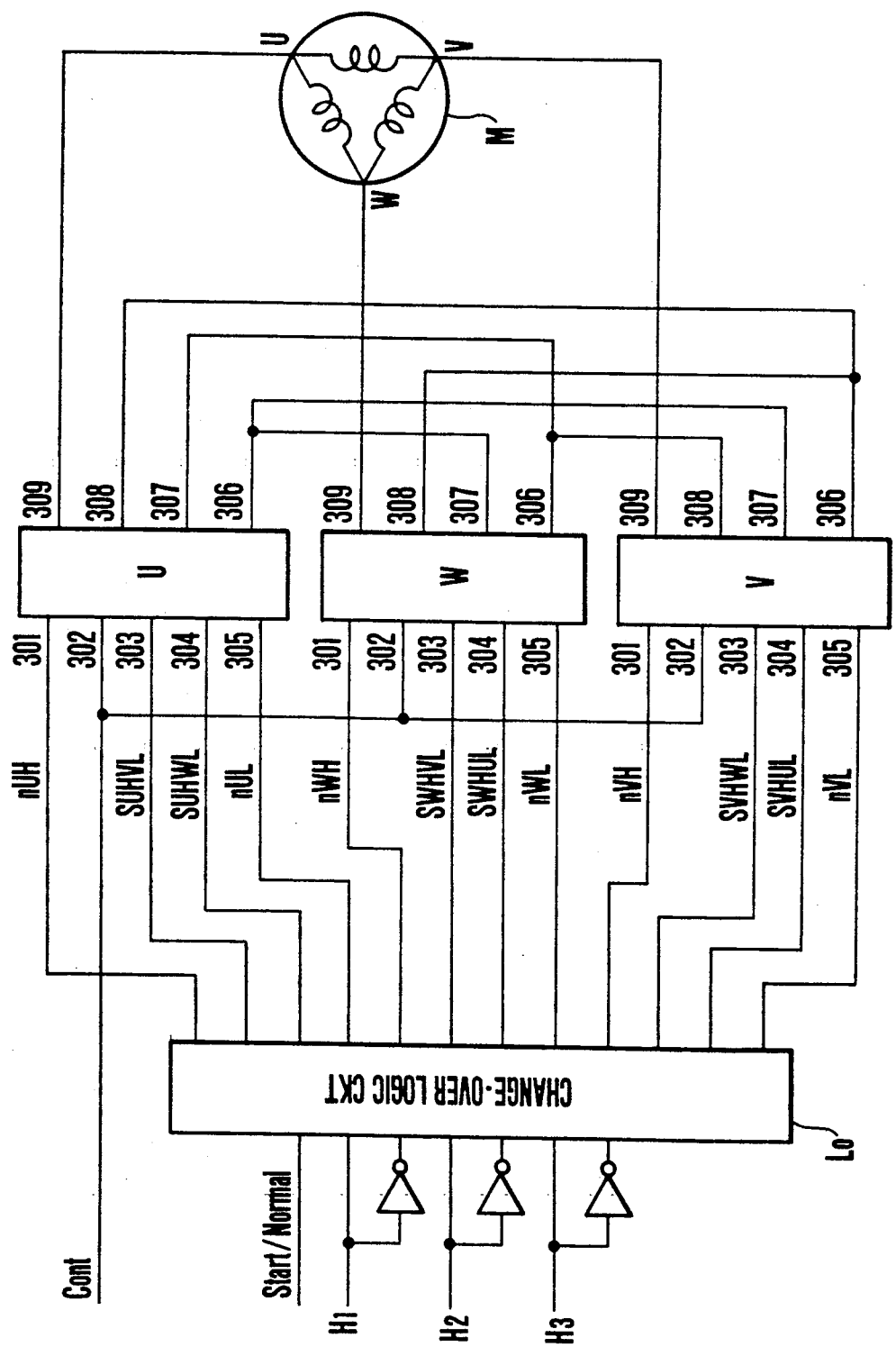
FIG. 8 is a diagram showing a motor control circuit arranged according to this invention as an embodiment thereof.
Figure 9:
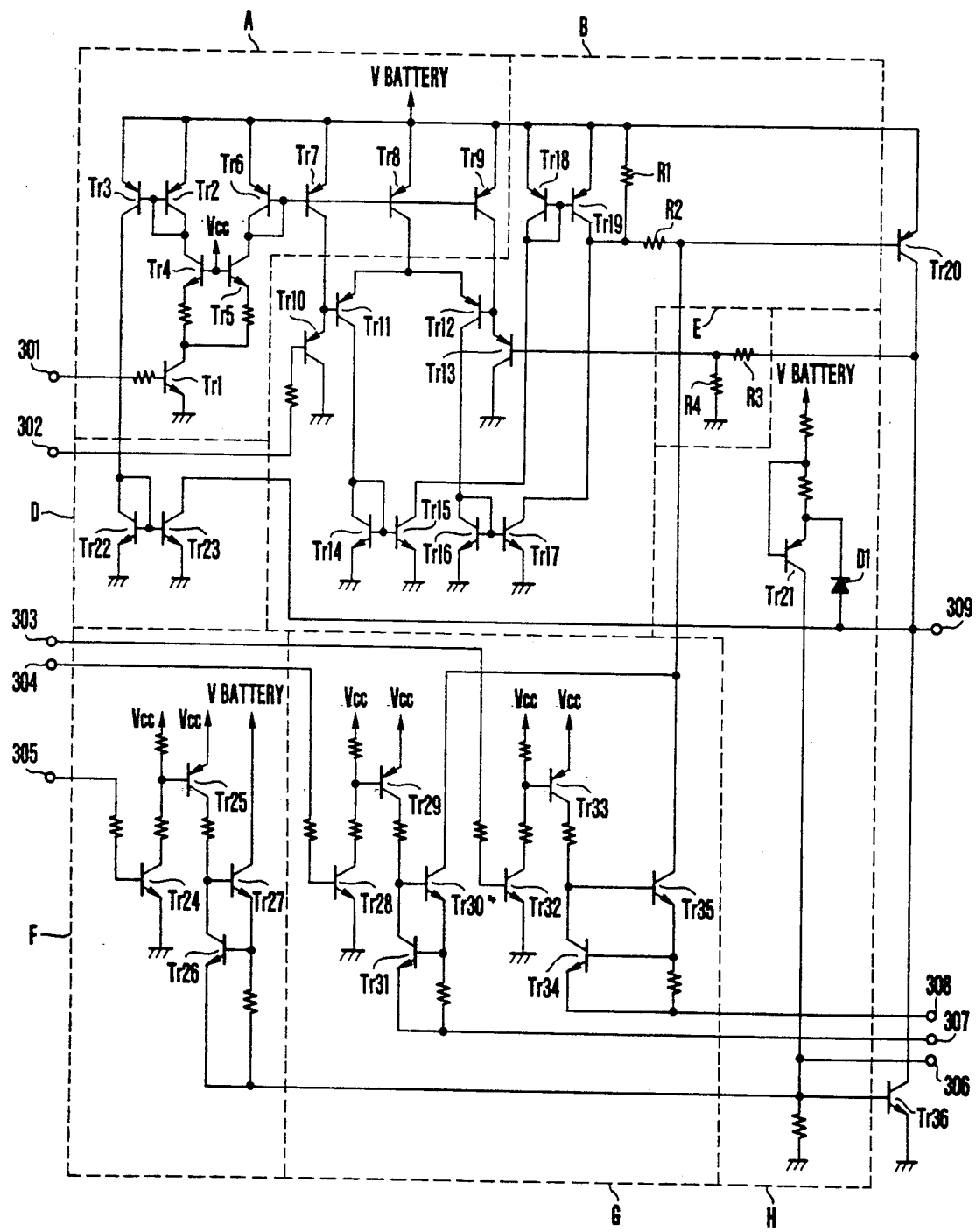
FIG. 9 is a circuit diagram showing the details of drive circuits U, V and W included in FIG. 8.

Further, using the operational amplifier OP, it is possible to raise the voltage to be applied to the motor M by connecting the transistor TR, for example, by Darlington connection. However, it has been still difficult to raise the voltage to be applied to the motor M to a sufficiently high value even by Darlington connection. Whereas, this problem is solved by the motor control circuit included in an embodiment of this invention which is arranged as shown in FIG. 8 and ensuing drawings. The following description of the embodiment is on the assumption that the motor is a three-phase motor: FIG. 8 shows the motor control circuit of the embodiment in a block diagram. FIG. 9 is a circuit diagram showing the details of drive circuits U, V and W shown in FIG. 8. The drive circuits U, V and W are respectively arranged to control the voltage of U-phase, V-phase and W-phase terminals of the motor M. A change-over logic circuit Lo is arranged to control the drive circuits U, V and W. The change-over logic circuit Lo is receiving a Start/Normal signal which corresponds to the data signal supplied from the controller 91 to the D/A converter 89' of FIG. 1A. The Start/Normal signal is arranged to be at "1" in a start mode which corresponds to, for example, the action of the step S100 of FIG. 3 for the quick build-up of the rotation of the motor M and to be at "0" in a normal mode which corresponds to, for example, the action of the step S04' of FIG. 2 for the normal build-up or the rotation of the motor. This change-over control is performed, for example, by means of the system controller 91 shown in FIG. 1A. Pulses H1, H2 and H3 are produced according as the motor M rotates. As shown in FIG. 10, the phase of the motor M advances in the order of H1, H3 and H2 by 120 degree at a time. The pulses H1, H2 and H3 are produced in synchronism with a signal which is obtained by detecting the rotating state of the motor M with a detector (not shown) and corresponds to, for example, the FG signal of FIG. 1A. In FIG. 10, the numerals 1 to 6 on the axis of abscissa indicate a phase sequence.

The change-over logic circuit Lo produce signals nUH, nWH and nVH, which are respectively supplied to input terminals 301 of the drive circuits U, W and V. When each of these signals becomes "1", electric energy is supplied to the operational amplifier of the drive circuit U, W or V to apply a voltage to applicable one of the U-phase, W-phase and V-phase terminals of the motor M. The control signal Cont is arranged to be supplied to terminals 302 of the drive circuits U, W and V respectively for the purpose of controlling the level of the voltage to be applied to the motor M via the drive circuits. Signals SUHVL, SWHVL and SVHWL are arranged to be supplied to terminals 303 of the drive circuits U, W and V respectively and to rise up to "1" one after another in the event of the start mode for the high build-up speed of the motor M. For example, the power supply voltage is applied to the U-phase terminal of the motor M when the signal SUHVL rises to "1". Then, the V-phase terminal is grounded. A current flows between the points U and V of the motor M to cause the motor to rotate. Likewise, when the signal SWHVL rises to "1", the power supply voltage is applied to the W-phase terminal of the motor M. The V-phase terminal is then grounded and a current flows between the points W and V of the motor. When the signal SVHWL rises to "1", the power supply voltage is applied to the V-phase terminal of the motor M and the W-phase terminal is grounded. Signals SUHWL, SWHUL and SVHUL are arranged to be supplied to terminals 304 of the drive circuits U, W and V. In the same manner as the signals coming to the terminals 303, the power supply voltage is applied to the U-phase terminal of the motor M when the signal SUHWL rises to "1"; the W-phase terminal is grounded; and a current flows between the points U and W of the motor M. The power supply voltage is applied to the W-phase terminal of the motor M when the signal SWHUL rises to "1"; then the U-phase terminal is grounded; and a current flows between the points W and V of the motor. When the signal SVHUL rises to "1", the power supply voltage is applied to the V-phase terminal of the motor M; the U-phase terminal is grounded; and a current flows between the points V and U of the motor M. Signals nUL, nwl and nVL are arranged to be supplied to terminals 305 of the drive circuits U, W and V. Contrarily to the signals coming to the terminals 301, the corresponding terminal of the motor M is grounded when each of the these signals nUL, nWL and nVL becomes "1". Further, each of the drive circuits U, W and V is arranged to raise the voltage to be applied to the motor M in the start mode of a high build-up speed and to lower the voltage in the start mode of a normal build-up speed as will be further described later.

In the change-over logic circuit Lo, the signals to be supplied in response to the signals H1 to H3 and the Start/Normal signal to each of the drive circuits are arranged to be supplied in accordance with logical expressions given in FIG. 11. In FIG. 11, a left column shows the signals to be produced from the change-over logic circuit Lo. A right column shows the logical expressions or formulas corresponding to these outputs. In the formulas, a term "S" represents the Start/Normal signal which becomes "1" in the high build-up speed start mode and becomes "0" in the normal build-up speed start mode. Further, the column of logical expression includes a column captioned "DC motor" which shows logical formulas to be used in driving a DC motor when the DC motor is connected between the terminal 309 of the drive circuit V and the terminal 309 of the drive circuit W of the motor control circuit of this embodiment.

Figure 12:
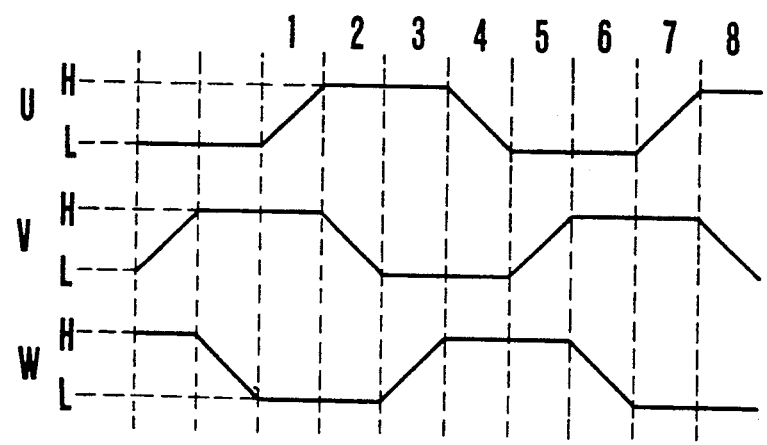
FIG. 12 is a time chart showing voltages to be applied to a motor M from the drive circuits.

As shown in FIG. 11, the signals nVHL and nWL are produced from the change-over logic circuit Lo when the normal mode is selected with the DC motor connected and the signal SVHWL is produced when the high speed start mode is selected with the DC motor connected. Therefore, with the DC motor employed, a current is allowed to flow to the V-phase terminal and the W-phase terminal is grounded in both the high speed start mode (hereinafter referred to as start mode) and the normal start mode (hereinafter referred to as normal mode). In case that a three-phase motor is connected to the drive circuits U, W and V, the voltages to be applied to the U-phase and V-phase terminals of the motor are controlled on the basis of the signals supplied from the change-over logic circuit Lo to the drive circuits U, W and V. FIG. 12 shows these voltages. In FIG. 12, numerals 1 to 6 which represent a phase sequence on the axis of abscissa correspond to the numerals 1 to 6 of FIG. 10. The axis of ordinate show the voltages applied to the terminals. A reference symbol H represents the voltage obtained when the power source is connected to each of the terminals. A symbol L represents a voltage obtained when each of these terminals is grounded. An intermediate level of the voltage indicates an opened state of each terminal. In the case of driving a three-phase motor, the voltages shown in FIG. 12 are applied to the motor M according to the pulses H1, H2 and H3 shown in FIG. 10. The motor M is thus three-phase driven by the voltages shown in FIG. 12. The drive circuits U, W and V are arranged in exactly the same manner as shown in FIG. 9.

Referring to FIG. 9, terminals 301 to 309 are identical with the terminals shown in FIG. 8. A part A represents a power supply part for an operational amplifier part B. The power supply part A consists of transistors Tr1 to Tr9 all of which turn on upon receipt of an input "1" at the terminal 301. The operational amplifier part B which receives electric energy from the power supply part A is arranged to compare the level of the control signal Cont coming via the terminal 302 with that of the voltage applied via a feedback part E to the motor M and to control the base current of a transistor Tr20 through a resistor R2 in such a manner as to make the two come to coincide with each other. In the operational amplifier part B, a current mirror circuit including transistors Tr4, Tr5, Tr16, Tr17, Tr18 and Tr19 is arranged to amplify the current output of the amplifier part B and thus to make the current larger. More specifically, the PN junction area of the transistors Tr15 and Tr17 is arranged to be larger than that of the transistors Tr14 and Tr16 so that the current can be amplified. A leak preventing resistor R1 is arranged to prevent a leak current from causing the transistor Tr20 to erroneously turn on by flowing between the base and the emitter of the transistor Tr20. A damping resistor R2 is arranged to prevent the output of the operational amplifier part B from oscillating. The operational amplifier part B is provided with a feedback part E, which is composed of resistors R3 and R4. The transistor Tr20 has the emitter thereof connected to a power source VBATTERY, the collector connected to the motor M and the base connected to the output terminal of the operational amplifier part B and that of a base circuit G which is provided for the start mode. A transistor Tr36 has its emitter connected to the ground, its collector to the above-stated terminal 309 and its base to a portection circuit H for the transistor Tr20 or the terminal 306 and the output terminal of a switch circuit F. With the transistors Tr20 and Tr36 arranged in this manner, the terminal 309 of the drive circuit is either connected to the power source VBATTERY or grounded. The switch circuit F is arranged to turn on all the transistors Tr24 to Tr27 and to cause the transistor Tr36 to turn on by supplying a current to the base thereof when the signal coming via the terminal 305 is at "1".

A base circuit G for the above-stated start mode is arranged to turn on all transistors Tr32 to Tr35 when the signal coming via the terminal 303 is at "1" and to turn on the transistor Tr20 by pulling the base current of the transistor Tr20 in between the collector and the emitter of the transistor Tr35 when the signal coming to the terminal 308 is at "1". Further, when the signal coming via the terminal 304 is at "1", all transistors Tr28 to Tr31 turn on. Then, the instant the terminal 307 receives the input signal at "1", the transistor Tr20 is turned on with the base current of the transistor Tr20 pulled in between the collector and the emitter of the transistor Tr30. Further, the terminals 307 and 308 are connected to the terminals 306 of other drive circuits as shown also in FIG. 8. Therefore, when the signal coming via the terminal 303 or 304 becomes "1", the transistor Tr20 of the other drive circuit having the signal coming via its terminal 303 or 304 at "1" is also turned on to have its terminal 309 connected to the power source VBATTERY. At the same time, the transistor Tr36 of another drive circuit is turned on via the terminal 307 or 308 of the other drive circuit and the terminal 306 of another drive circuit. As a result, a current flows to some of the windings of the motor M to cause the motor to rotate.

In case that the base current of the transistor Tr20 is pulled by means of the base circuit G for the start mode, the base current of the transistor Tr20 can be made larger than the base current pulled by means of the operational amplifier part A, because all the transistors of the circuit G are operating within their saturation ranges. The voltage between the collector and the emitter of the transistor Tr20 thus can be lowered, so that a high voltage can be applied to the motor M for quick build-up of the rotation of the motor.

A protection circuit H is provided for the purpose of preventing the transistor Tr20, etc. from being damaged by a back electromotive force coming from the motor M while both the transistors Tr20 and Tr19 are in their OFF states. This circuit H consists of a transistor Tr21 which has its collector connected to the base of the transistor Tr36 and its emitter to the cathode of a diode D1 and is arranged to turn on when a back electromotive voltage generated at the terminal 309 by the motor M becomes higher than the power supply voltage VBATTERY; and a diode D1 which is connected between the terminal 309 and the emitter of the transistor Tr21. A current mirror circuit D is arranged to cause a back electromotive current which comes from the motor M to flow out to the ground. The circuit D is composed of transistors Tr22 and Tr23.

The embodiment which is arranged as shown in FIGS. 8 and 9 operates in the following manner: Let us first describe its operation in the normal mode. In the normal mode, the Start/Normal signal is at "0". The signals nUH, nVH and nWH produced from the changeover logic circuit of FIG. 8 becomes "1" one after another according to the logical formulas shown in FIG. 11. A power supply is effected by the power supply part A to the operational amplifier part B of each of the drive circuits U, V and W shown in FIG. 8. The base current of the transistor Tr20 of each drive circuit is supplied according to the level of the control signal Cont coming to the terminal 302. The base current is applied to the terminal 309 of each of the drive circuits U, V and W. Meanwhile, with the signals nUL, nVL and nWL of FIG. 8 becoming "1" one after another according to the logical formulas, the switch circuit F of each of the drive circuits U, V and W causes the base current of the transistor Tr36 to be supplied to ground the terminal 309. In this instance, the voltages of terminals are in a relation as shown in FIG. 12. The motor M is rotated by the voltages shown in FIG. 12.

In the above-stated normal mode, since the transistor Tr20 of each of the drive circuits U, V and W is driven by the output of the operational amplifier part A, the base current of the transistor Tr20 does not become so large and thus allows the voltage of the terminal 309 which is determined by the level of the control signal Cont to be applied to the motor M.

Further, in accordance with the circuit arrangement of this embodiment, the operational amplifier part B of each of the drive circuits U, V and W receives the electric energy from the power supply part A according to the signals nUH, nVH and nWH produced from the change-over logic circuit Lo. The operational amplifier part B, therefore, is receiving the electric energy only when necessary. Compared with the conventional motor control circuit which is arranged to incessantly supply electric energy to the operational amplifier part for controlling the driven state of the motor by switching the output of the operational amplifier part, the embodiment is capable of reducing the electric energy consumption to a great degree.

In the case of the start mode (quick start mode), the Start/Normal signal is at "1". Signals which are obtained according to the logical formulas shown in the lower part of FIG. 11 are supplied from the change-over logic circuit Lo to the terminals 303 and 304 of each of the drive circuits U, V and W.

In this case, the voltages of phases as shown in FIG. 12 are also supplied to the applicable terminals in the same manner as in the normal mode with the exception of that the voltages applied to these terminals are higher in the start mode than in the normal mode.

More specifically, as apparent from the pulses H1, H2 and H3 shown in FIG. 10, the signal SUHWL from the change-over logic circuit Lo becomes "1" when the pulse H1 is at "1", the pulse H2 at "0" and the pulse H3 at "0" as shown at the phase sequence part "2" in the time chart of FIG. 10. In that instance, the power supply voltage is applied to the U-phase terminal while the W-phase terminal is grounded as shown at the phase sequence part "2" in FIG. 12.

The internal operation of each drive circuit is as follows: When the signal SUHWL becomes "1", a signal of "1" is supplied to the terminal 304 shown in FIG. 9. This "1" input causes the transistors Tr28 to Tr31 of the base circuit G for the start mode to turn on. As a result, the transistor Tr20 turns on to have a voltage applied to the terminal 309. At the same time, the base circuit G causes a signal of "1" supplied from the terminal 307 of the drive circuit U to the terminal 306 of the drive circuit W. This causes the transistor Tr36 of the drive circuit W to turn on to have a current flow between the points U and W of the motor M.

Following that, the voltages are applied to the terminals of the motor M in accordance with the logical formulas shown in FIG. 11.

As mentioned in the foregoing, unlike in the normal mode, the transistor Tr20 is turned on by the output of the start mode base circuit G instead of the output of the operational amplifier part B in the case of the start mode. In this instance, therefore, the base current of the transistor Tr20 becomes larger than in the case of turning the transistor Tr20 on by the output of the operational amplifier part B.

In the start mode, therefore, the voltage applied to the terminal 309 becomes higher than in the case of the normal mode and the motor can be allowed to begin its driving action at a high build-up speed. Further, since the base current of the transistor Tr20 is large, the electric energy loss between the collector and the emitter of the transistor Tr20 can be lessened in the start mode.

As described in the foregoing, despite of simple circuit arrangement, this embodiment is capable of adequately performing control to allow a greater amount of current to flow in driving the motor at a high speed and to have a smaller amount of current flow to the motor in driving the motor at a relatively low speed.

What is claimed is:

1. A recording and/or reproducing apparatus comprising:
   (a) recording and/or reproducing means for recording and/or reproducing information on a medium;
   (b) drive means for changing a relative position between said recording and/or reproducing means and said medium; and
   (c) supply means for supplying electrical energy to said drive means in accordance with a control signal, said supply means having a first start mode in which said control signal is fixed and a second start mode in which said control signal is variable, said supply means being arranged to control drive speed of said drive means to a substantially same speed in said first start mode as well as in said second start mode.

2. An apparatus according to claim 1 wherein: said supply means is arranged to change over between said first start mode and said second start mode in accordance with an operating condition of said recording and/or reproducing apparatus.

3. An apparatus according to claim 2, further comprising:
an electric supply source for supplying electric energy to said drive means.

4. An apparatus according to claim 3, wherein said supply means is arranged to change over between said first start mode and said second start mode in accordance with a capacity for supplying electric energy of said electric energy supply source.

5. The apparatus according to claim 4, further comprising:
detecting means for detecting the capacity for supplying electric energy of said electric energy supply source.

6. The apparatus according to claim 5, wherein said detecting means is a means for detecting a capacity of said electric energy supply source.

7. The apparatus according to claim 6, wherein said detecting means is a means for connecting a load to said electric energy supply source to detect a voltage drop.

8. The apparatus according to claim 1, wherein said recording and/or reproducing means is a transducing head.

9. The apparatus according to claim 1, wherein said medium is disc-like.

10. The apparatus according to claim 9, wherein said drive means is a means for rotating said disc-like medium.

11. The apparatus according to claim 10, wherein said drive means is a motor.

12. The apparatus according to claim 11, wherein said supply means changes over between said first start mode and said second start mode by controlling a voltage applied to said motor.

13. A recording and/or reproducing apparatus comprising:
(a) recording and/or reproducing means for recording and/or reproducing information on a medium;
(b) drive means for changing a relative position between said recording and/or reproducing means and said medium; and
(c) control means for controlling energy to be supplied to said drive means, said control means having a first start mode in which said energy is limited to a first value and second start mode in which said energy is limited to a second value lower than said first value, said control means generating a control signal in said first start mode which is a fixed signal and generating a control signal in said second start mode which is a variable signal;
(d) supply means for supplying electrical energy to said drive means in accordance with said control signal, said supply means having a first start mode when said control signal is fixed and a second start mode when said control signal is variable, said supply means being arranged to control drive speed of said drive means to a substantially same speed in said first start mode as well as in said second start mode, wherein said supply means is arranged to change between said first start mode and said second start mode in accordance with a capacity of an electric energy supply source; and
(e) detecting means for detecting said capacity for supplying energy of said electric energy supply source, said detecting means being a means for discriminating kinds of said electric energy supply sources.

14. The apparatus according to claim 13, wherein said detecting means is a means for detecting whether said electric energy supply source is an AC adapter or a battery.

15. An apparatus according to claim 13, wherein said recording and/or reproducing means is a transducing head.

16. An apparatus according to claim 13, wherein said medium is disc-like.

17. An apparatus according to claim 16, wherein said drive means is a means for rotating said disc-like medium.

18. An apparatus according to claim 13, wherein said drive means is a motor.

19. A drive apparatus for a recording and/or reproducing apparatus including a drive means for changing a relative position between a record and/or reproducing head and a recording medium, comprising:
(a) supply means for supplying electrical energy to said drive means in accordance with a control signal, said supply means having a first start mode in which said control signal is fixed and a second start mode in which said control signal is variable, said supply means being arranged to control drive speed of said drive means to a substantially same speed in said first start mode as well as in said second start mode.

20. An apparatus according to claim 19, further comprising:
detecting means for detecting whether said electrical energy supply means includes an AC adapter or a battery.

21. An apparatus according to claim 20, wherein said drive means is a motor.

22. An apparatus according to claim 20, wherein said supply means changes over between said first start mode and said second start mode in accordance with detection by said detecting means.

23. An apparatus according to claim 19, wherein said recording and/or reproducing head is a transducing head.

24. An apparatus according to claim 19, wherein said medium is disc-like.

25. An apparatus according to claim 24, wherein said drive means is a means for rotating said disc-like medium.

26. A drive control apparatus, comprising:
(a) drive means for changing a relative position between a first object and a second object; and
(d) supply means for supplying electrical energy to said drive means in accordance with a control signal, said supply means having a first start mode in which said control signal is fixed and a second start mode in which said control signal is variable, said supply means being arranged to control drive speed of said drive means to a substantially same speed in said first start mode as well as in said second start mode.

27. An apparatus according to claim 26, further comprising:
detecting means for detecting whether said electric energy supply means includes an AC adapter or a battery.

28. An apparatus according to claim 26, wherein said drive means is a motor.

29. An apparatus according to claim 27, wherein said supply means changes over between said first start mode and said second start mode in accordance with detection by said detecting means.

* * * * *